US011625035B2

(12) United States Patent
Mahaney, Jr. et al.

(10) Patent No.: US 11,625,035 B2
(45) Date of Patent: Apr. 11, 2023

(54) REMOTE-CONTROLLED VEHICLE WITH CAMERA MOUNT

(71) Applicant: Tactical R/C, LLC, Wilmington, DE (US)

(72) Inventors: Shawn Mahaney, Jr., Prior Lake, MN (US); Joshua Dean, Lakeville, MN (US); Joshua Otis, Bentonville, AR (US)

(73) Assignee: TACTICAL R/C, LLC, Wilmington, DE (US)

( * ) Notice: Subject to any disclaimer, the term of this patent is extended or adjusted under 35 U.S.C. 154(b) by 127 days.

(21) Appl. No.: 17/177,685

(22) Filed: Feb. 17, 2021

(65) Prior Publication Data
US 2021/0255615 A1    Aug. 19, 2021

Related U.S. Application Data

(60) Provisional application No. 62/978,358, filed on Feb. 19, 2020.

(51) Int. Cl.
G05D 1/00        (2006.01)
G05D 1/02        (2020.01)
B60R 11/04       (2006.01)

(52) U.S. Cl.
CPC ............ G05D 1/0016 (2013.01); B60R 11/04 (2013.01); G05D 1/0223 (2013.01); G05D 1/0227 (2013.01)

(58) Field of Classification Search
CPC .. G05D 1/0016; G05D 1/0223; G05D 1/0227; B60R 11/04
See application file for complete search history.

(56) References Cited

U.S. PATENT DOCUMENTS

| 5,481,257 A | * | 1/1996 | Brubaker | ............... H04N 7/185 340/13.24 |
| 6,095,890 A | | 8/2000 | George et al. | |
| 6,378,653 B1 | * | 4/2002 | Takahashi | ............. B66F 11/046 182/62.5 |

(Continued)

FOREIGN PATENT DOCUMENTS

| CN | 105984541 A | * | 10/2016 |
| CN | 105563451 B | * | 1/2018 |

OTHER PUBLICATIONS

English translation of CN-105984541-A.*
English translation of CN-105563451-B.*

Primary Examiner — Anshul Sood
Assistant Examiner — Matthew Ho
(74) Attorney, Agent, or Firm — Fredrikson & Byron, P.A.

(57) ABSTRACT

A remote-controlled vehicle includes a vehicle body, a first wheel, a second wheel, and a camera mount. The first wheel is rotatably coupled to a first side of the vehicle body, and the second wheel is rotatably coupled to a second side of the vehicle body. Each of the first wheel and the second wheel has a first height measured in a direction perpendicular to a central longitudinal plane of the vehicle body. The camera mount is coupled to the vehicle body, and the camera mount is configured to removably couple to a camera device. The camera mount has a second height measured in the direction perpendicular to the central longitudinal plane, and the second height is less than the first height such that the camera mount does not extend outside of the first height.

17 Claims, 13 Drawing Sheets

(56) References Cited

U.S. PATENT DOCUMENTS

| | | |
|---|---|---|
| 9,377,161 B2 | 6/2016 | Hanchett et al. |
| 9,756,930 B2 | 9/2017 | Hanchett et al. |
| 10,413,046 B2 | 9/2019 | Hanchett et al. |
| 2006/0237239 A1* | 10/2006 | Bruner ................... B62D 55/12 180/9.1 |
| 2010/0179691 A1* | 7/2010 | Gal ................... H04N 5/23216 700/259 |
| 2012/0043149 A1 | 2/2012 | Kim et al. |
| 2017/0158266 A1 | 6/2017 | Rudakevych et al. |
| 2017/0176987 A1* | 6/2017 | Deng ........................ F16B 2/10 |

* cited by examiner

REMOTE-CONTROLLED VEHICLE WITH CAMERA MOUNT

RELATED APPLICATION

This application claims priority to U.S. provisional patent application No. 62/978,358, filed on Feb. 19, 2020.

TECHNICAL FIELD

This disclosure generally relates to remote-controlled vehicles with a camera mounting feature as well as related devices, systems, and methods.

BACKGROUND

Robotic devices can be used in a variety of applications as an alternative to human action. Examples include applications in difficult to access locations as well as in situations that could pose a danger to a human actor.

One particular application in which robotic devices are used is law enforcement activity. Law enforcement officers can use robotic devices to gather information at a scene before a law enforcement officer physically enters the scene. Doing so can reduce the likelihood that a law enforcement officer is placed in a dangerous situation, and, if a law enforcement officer does physically enter the scene, increase the amount of intel available to the law enforcement officer when doing so.

SUMMARY

In general, various embodiments relating to remote-controlled vehicles with a camera mounting feature as well as devices, systems, and methods related to such vehicles are disclosed herein.

Currently available robotic devices are very complex devices, generally including a number of permanently integrated sensors, imaging devices, communication hardware, and advanced mobility features. The complexity of these currently available robotic devices results in a relatively high cost. This complexity, and ensuing high cost, tends to decrease the utilization of these currently available robotic devices. Thus, while these robotic devices can serve their intended purpose, it is generally cost prohibitive to conveniently deploy these robotic devices in many everyday applications.

For example, in law enforcement, the cost of these robotic devices generally prevents the majority of law enforcement officers from having quick and easy access to such robotic devices. Rather, such robotic devices, if possessed at all by a law enforcement agency, are generally selectively deployed in a small number of specialized units. If a law enforcement officer wishes to utilize one of these robotic devices, the law enforcement officer generally needs to request the presence of the specialized unit and then wait for the specialized unit to arrive at the scene. This inaccessibility and delay often results in the law enforcement officer going without the robotic device, often times putting the law enforcement officer directly in harm's way without advanced intel as to the situation the law enforcement officer is entering.

Accordingly, embodiments disclosed herein can provide a relatively simplistic, low-cost remote-controlled vehicle with a camera mounting feature. The low-cost nature of the embodiments disclosed herein can thereby increase access to remote visualization and, accordingly, reduce instances in which a law enforcement officer is placed in a dangerous situation and increase the amount of intel the law enforcement officer can obtain prior to entering the scene.

For example, in law enforcement applications, embodiments disclosed herein can be sized and cost effective so as to allow individual law enforcement officers to carry an embodiment of the remote-controlled vehicle disclosed herein with them to a scene. In particular, embodiments of the remote-controlled vehicle disclosed herein can include a camera mounting feature that is configured to securely couple to a law enforcement officer's body worn camera. This can allow embodiments of the remote-controlled vehicle disclosed herein to facilitate the benefits associated with remote visualization while utilizing technology already deployed on a law enforcement officer, thereby reducing the incremental cost of the vehicle. In this way, a law enforcement officer arriving at a scene can immediately access and deploy an embodiment of the remote-controlled vehicle disclosed herein by simply attaching that officer's body worn camera to the remote-controlled vehicle. As such, embodiments of the remote-controlled vehicle disclosed herein can increase access to remote visualization in everyday applications in a cost-effective manner.

One embodiment includes a remote-controlled vehicle. This embodiment of the remote-controlled vehicle includes a vehicle body, a first wheel, a second wheel, a camera mount, a wireless receiver, and processing means. The first wheel is rotatably affixed at a first side of the vehicle body and the second wheel is rotatably affixed at a second, opposite side of the vehicle body. The camera mount is affixed at the vehicle body, and the camera mount is configured to removably couple to a camera device. The wireless receiver is configured to receive a wireless vehicle movement command signal from a controller and, in response to the received wireless vehicle movement command signal, the processing means is configured to cause at least one of the first wheel and the second wheel to rotate relative to the vehicle body.

In a further embodiment of the remote-controlled vehicle, each of the first wheel and the second wheel has a first height (e.g., measured in a direction perpendicular to a central longitudinal plane of the remote-controlled vehicle). The camera mount is configured to removably couple with a camera device such that the camera device does not extend outside of the first height. In such embodiment, the camera mount has a second height (e.g., measured in a direction perpendicular to the central longitudinal plane of the remote-controlled vehicle) that is less than the first height. And, in some such embodiments, the second height of the camera mount can be within the first height of the first and second wheels such that the camera mount does not extend out beyond the opposite ends of each of the first and second wheels between which the first height extends (e.g., the opposite ends of the first and second wheels, between which the first height extends, form the furthest extent of the remote-controlled vehicle). Such a configuration can be useful, for example, in embodiments where the remote-controlled vehicle can be configured to move at first and second different orientations. Each of the first orientation and the second orientation positions a central longitudinal plane of the vehicle body to extend parallel to the ground surface. The second orientation can be an orientation that is rotated one hundred and eighty degrees about the central longitudinal plane of the vehicle body from the first orientation (e.g., "flipped upside down"). Embodiments where the camera mount is configured to removably couple with a camera device such that the camera device does not extend outside of the first height can allow these embodiments of the remote-controlled vehicle to move at each of the first and second different orientations without the camera mount, or camera device coupled thereto, impeding movement of the remote-controlled vehicle at either of the first and second different orientations.

The details of one or more examples are set forth in the accompanying drawings and the description below. Other features, objects, and advantages will be apparent from the description and drawings.

BRIEF DESCRIPTION OF THE DRAWINGS

The following drawings are illustrative of particular embodiments of the present invention and therefore do not limit the scope of the invention. The drawings are intended for use in conjunction with the explanations in the following description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing embodiments of the present invention. Examples of constructions, materials, and/or dimensions are provided for selected elements. Those skilled in the art will recognize that many of the noted examples have a variety of suitable alternatives.

Figure 1:
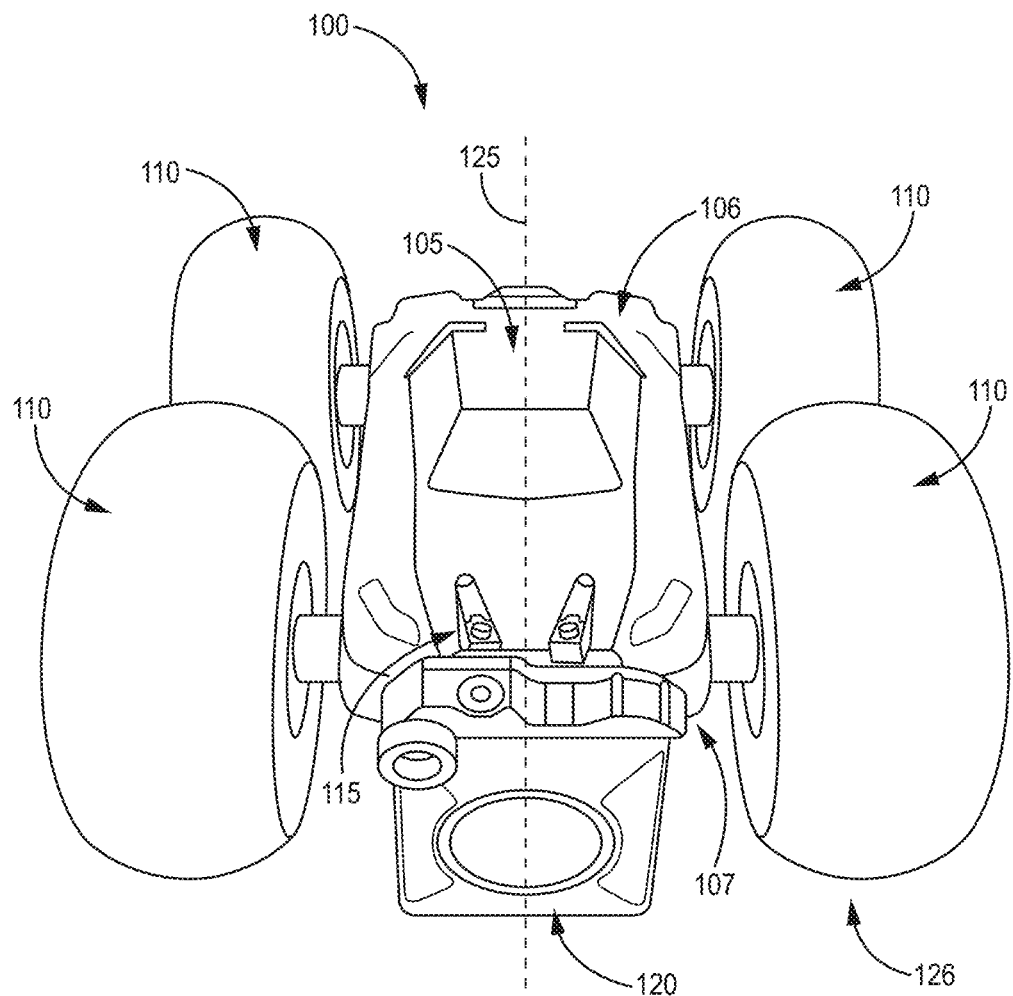
FIG. 1 is a perspective view of an embodiment of a remote-controlled vehicle.

FIG. 1 illustrates a perspective view of an embodiment of a remote-controlled vehicle 100. The remote-controlled vehicle 100 includes a vehicle body 105, wheels 110, and a camera mount 115. The wheels 110 and the camera mount 115 are affixed to the vehicle body 105. Specifically, each of the wheels 110 is rotatably affixed to the vehicle body 105. In the illustrated embodiment, two wheels 110 are rotatably affixed to the vehicle body 105 at a first side of the vehicle body 105, and two wheels 110 are rotatably affixed at a second, opposite side of the vehicle body 105. The camera mount 115 is affixed at the vehicle body 105, such as at a location on the vehicle body 105 between the first and second opposite sides of the vehicle body 105 at which the wheels 110 are affixed. More particularly, as shown in FIG. 1, the camera mount 115 can be affixed at the vehicle body 105 at a location on the vehicle body 105 both i) between the first and second opposite sides of the vehicle body 105 (the sides at which the wheels 110 are affixed), and ii) at, or near, an end portion of the vehicle body 105 (e.g., a front end portion of the vehicle body 105, as shown in FIG. 1).

As shown in the embodiment of FIG. 1, the camera mount 115 can be configured to removably couple to a camera device 120. In this way, the camera device 120 can be conveniently coupled to, and removed from, the camera mount 115. The camera mount 115 can include a variety of suitable structures for removably coupling to the camera device 120. As one example, the camera mount 115 can include a base bracket defining a coupling slot. The coupling slot of the base bracket can be configured to receive a complementary fitting of the camera device 120 and thereby create an interference fit between the coupling slot and the camera device's complementary fitting. For instance, the camera device 120 could be removably coupled at the base bracket of the camera mount 115 by imparting relative movement between the coupling slot and the camera device's complementary fitting to result in a locking engagement between the camera mount 115 and the camera device 120.

In various embodiments, the camera device 120 can be a body worn camera device. In such embodiments, the camera mount 115 can be configured to removably couple to the body worn camera device. In these embodiments, the camera mount 115 can include features of a body worn camera mount so that the body worn camera can be removably coupled to the camera mount 115 in a similar, or same, manner as the body worn camera is coupled to the body worn camera mount. Accordingly, the remote-controlled vehicle 100 with this type of camera mount 115 can allow a body worn camera to be removed from a person, removably coupled to the remote-controlled vehicle 100 via the camera mount 115, and then the remote-controlled vehicle 100 to be used to capture image data (e.g., video clips, such as streaming video) at a location remote from the person from whom the body worn camera was removed.

The camera device 120 (e.g., the body worn camera device) can include a wireless transmitter that is configured to wirelessly transmit image data (e.g., video clips, such as streaming video) captured by the camera device 120. For instance, the wireless transmitter of the camera device can be a cellular, Wi-Fi, and/or Bluetooth transmitter configured to transmit image data to a remote viewing device, such as a smart phone, tablet, or other remote computing device.

The illustrated embodiment of the remote-controlled vehicle 100 includes four wheels 110, though other embodiments within the scope of the present disclosure can include other numbers of wheels. As one example, the remote-controlled vehicle 100 can include two wheels, with one wheel at one side of the vehicle body 105 and the other wheel at another, opposite side of the vehicle body 105. As another example, the wheels 110 can be configured as track roller wheels, where one belt extends around at least two wheels at one side of the vehicle body 105 and another belt extends around at least two wheels at another, opposite side of the vehicle body 105.

The remote-controlled vehicle 100 can be configured to move at first and second different orientations. The vehicle body 105 can define a central longitudinal plane 125 that extends through the center of the vehicle body 105 and is parallel to the ground surface 126. The remote-controlled vehicle 100 can be configured to move in a first orientation where: the central longitudinal plane 125 extends parallel to the ground surface 126, a first (e.g., "top") surface 106 of the vehicle body 105 faces away from the ground surface 126, and a second (e.g., "bottom") surface 107, which is opposite the first surface 106, faces toward the ground surface 126. This first orientation is shown in FIG. 1. The remote-controlled vehicle 100 can also be configured to move in a second orientation where: the central longitudinal plane 125 extends parallel to the ground surface 126, the second (e.g., "bottom") surface 107 of the vehicle body 105 faces away from the ground surface 126, and the first (e.g., "top") surface 106 faces toward the ground surface 126. As such, the second orientation can be an orientation that is rotated one hundred and eighty degrees about the central longitudinal plane of the vehicle body 105 from the first orientation (e.g., "flipped upside down"). In this way, the remote-controlled vehicle 100 can move along the ground surface 126 in the first orientation, flip one hundred and eighty degrees, and then continue to move along the ground surface 126 in the second orientation (e.g., an "upside-down" orientation).

Figure 2:
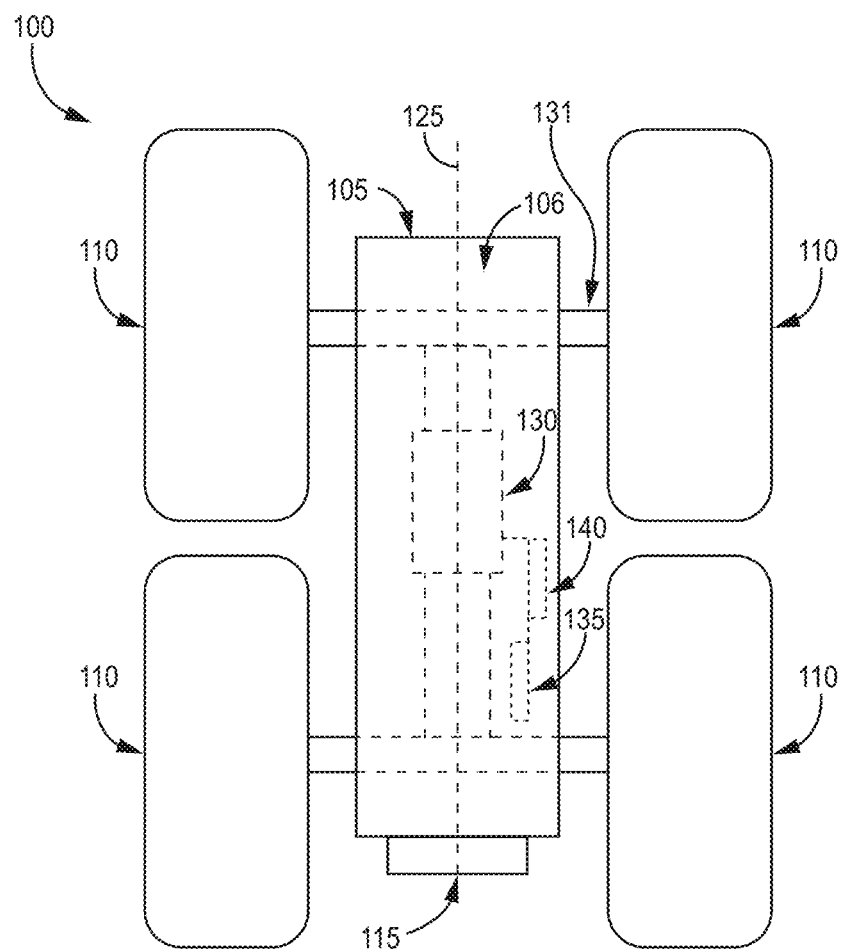
FIG. 2 is a top plan view of the embodiment of the remote-controlled vehicle.
Figure 3:
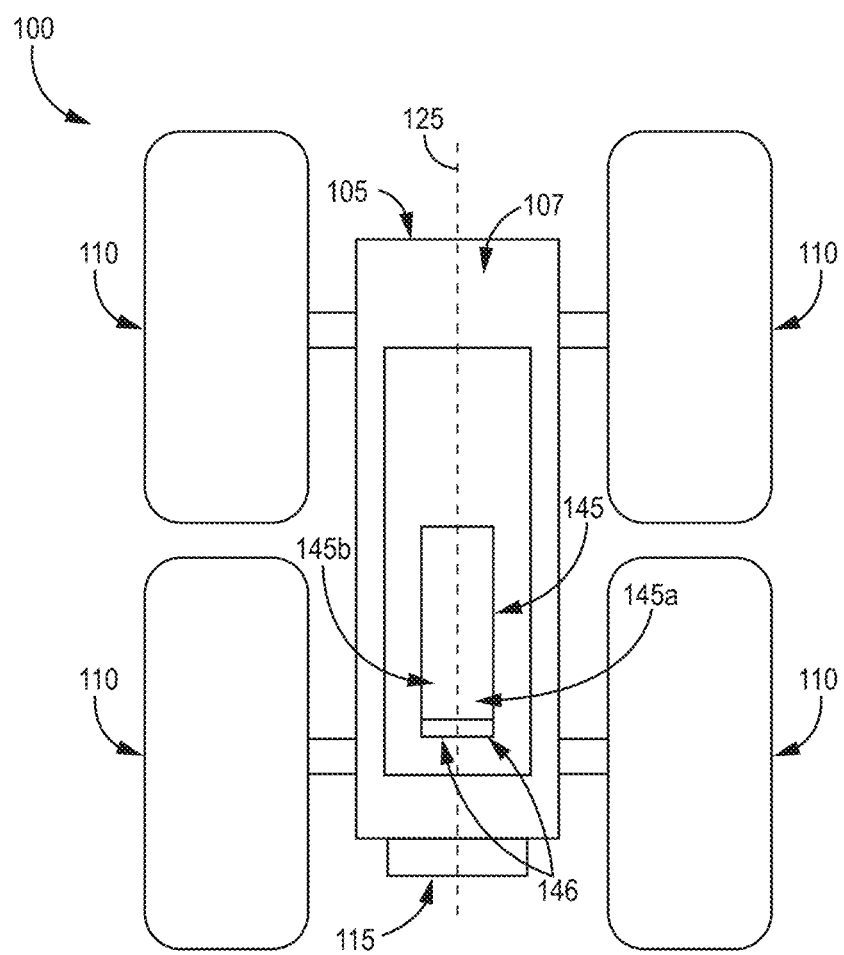
FIG. 3 is a bottom plan view of the embodiment of the remote-controlled vehicle.
Figure 4:
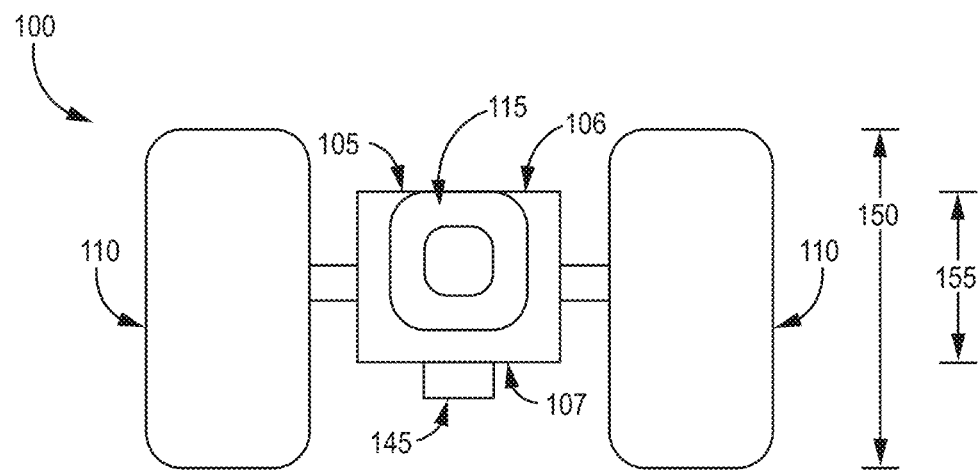
FIG. 4 is a front elevational view of the embodiment of the remote-controlled vehicle.
Figure 5:
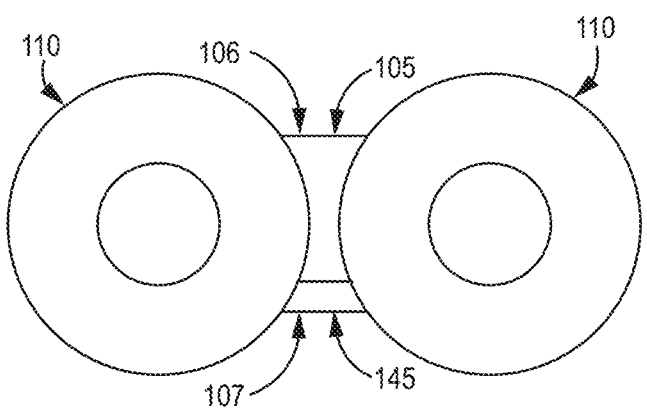
FIG. 5 is side elevational view of the embodiment of the remote-controlled vehicle.
Figure 6:
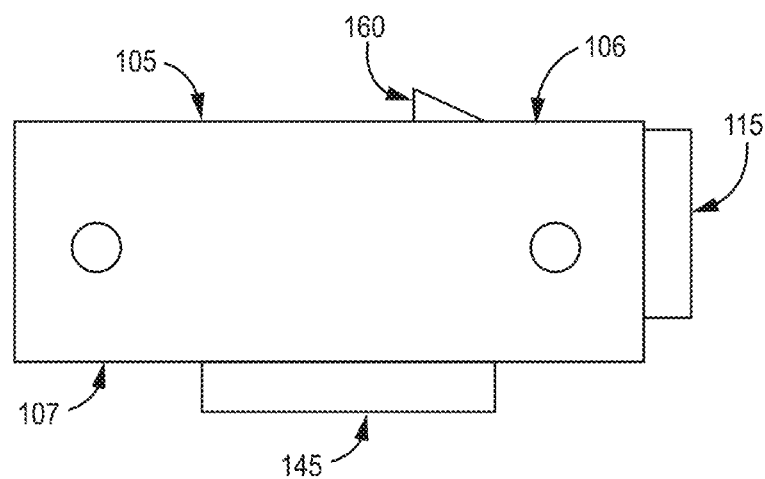
FIG. 6 is a side elevational view of the vehicle body of the embodiment of the remote-controlled vehicle.

FIGS. 2-6 illustrate various views of the remote-controlled vehicle 100 that show additional features that the remote-controlled vehicle 100 can include in certain embodiments. FIG. 2 shows a top plan view of the remote-controlled vehicle 100, FIG. 3 shows a bottom plan view of the remote-controlled vehicle 100, FIG. 4 shows a front elevational view of the remote-controlled vehicle 100, FIG. 5 shows a side elevational view of the remote-controlled vehicle 100, and FIG. 6 is a side elevational view of the vehicle body 105.

As seen in FIG. 2, the remote-controlled vehicle 100 can include a motive source 130 (e.g., a motor, such as an electric motor, for instance an electric gear motor), a wireless receiver 135, and a processing means 140. The processing means 140 can be in signal communication with each of the motive source 130 and the wireless receiver 135. As one example, the processing means 140 can include a programmable processor having computer executable instructions stored thereat in a non-transitory medium, and the processing means 140 can be configured to execute the computer executable instructions to perform one or more functions associated with the remote-controlled vehicle 100. As another example, the processing means 140 can include control electrical circuitry and associated hardware configured to generate signal outputs to cause one or more functions associated with the remote-controlled vehicle 100 to be carried out. The wireless receiver 135 can be configured to receive a wireless vehicle movement command signal from a remote controller and relay a corresponding signal to the processing means 140. In response to the received wireless vehicle movement command signal, the processing means 140 can be configured to cause at least one of the wheels 110 to rotate relative to the vehicle body 105 so as to move and/or turn the remote-controlled vehicle 100 corresponding to the received wireless vehicle movement command. For instance, in response to the received wireless vehicle movement command signal, the processing means 140 can be configured to cause to the motive source 130 to supply a motive force to one or more of the wheels 110, for instance via axels 131 (e.g., including gear motor axels), to move (e.g., rotate relative to the vehicle body 105) and/or turn (e.g., change an angular orientation relative to the vehicle body 105) the one or more of the wheels 110.

As seen in FIG. 3, the remote-controlled vehicle 100 can include a light source 145 at the vehicle body 105. In the illustrated embodiment, the light source 145 is mounted to the second (e.g., "bottom") surface 107 of the vehicle body 105. The light source 107 can include a light element 146 that is configured to output light energy (e.g., light energy with a wavelength in the visible spectrum and/or light energy in the infrared spectrum). As shown here, the light element 146 can be directed in a direction of the camera mount 115, such that the light energy output from the light element 146 can directed toward, and beyond, the camera mount 115. Accordingly, the light source 145 can be useful in illuminating the scene to which camera device 120, coupled to the camera mount 115, is directed and, thereby, can help to provide enhanced visibility in certain scenes in which the remote-controlled vehicle 100 is deployed. The embodiment illustrated in FIG. 3 includes two light sources 145a, 145b, each with a respective light element 146, though embodiments within the scope of the present disclosure can include one light source 145 or three or more light sources 145. For example, in one embodiment, the light source 145a can include a first type of light element 146 (e.g., a visible light element) and the light source 145b can include a second, different type of light element 146 (e.g., an infrared light element).

As seen in FIG. 4, the vehicle body 105, wheels 110, and camera mount 115 are configured to provide sufficient clearance for coupling the camera device at the camera mount 115 and still allowing the remote-controlled vehicle 100 to move in each of the first and second orientations. In particular, the wheels 110 can define a first height 150. As shown here, the first height can extend (e.g., in a direction perpendicular to the central longitudinal plane 125) from one end of a wheel 110 to another opposite end of that same wheel 110. The camera mount 115 can define a second height 155 that is less than the first height 150 such that the camera mount 115 can be positioned within the first height 150. And, the camera mount 115 can be configured to removably couple with the camera device 120 such that the camera device 120 does not extend outside of the first height 150.

The camera mount 115, configured as such, can allow the remote-controlled vehicle 100 to move at each of the first and second orientations without the camera mount 115, and camera device configured to coupled thereto, impeding movement at either of the first and second different orientations. Namely, the remote-controlled vehicle 100 can move in the first orientation, shown in FIG. 4, where: the central longitudinal plane 125 extends parallel to the ground surface 126, the first (e.g., "top") surface 106 of the vehicle body 105 faces away from the ground surface 126, and the second (e.g., "bottom") surface 107 faces toward the ground surface 126, with the camera mount 115 configured to removably couple with the camera device 120 such that the camera device 120 does not extend outside of the first height 150 and, thus, does not contact the ground surface 126. Likewise, the remote-controlled vehicle 100 can move in the second orientation, flipped one hundred and eighty degrees about the central longitudinal plane 126 from the first orientation shown in FIG. 4, where: the central longitudinal plane 125 extends parallel to the ground surface 126, the second (e.g., "bottom") surface 107 of the vehicle body 105 faces away from the ground surface 126, and the first (e.g., "top") surface 106 faces toward the ground surface 126, with the camera mount 115 configured to removably couple with the camera device 120 such that the camera device 120 does not extend outside of the first height 150 and, thus, does not contact the ground surface 126. In this way, the camera mount 115 can be configured to removably couple to the camera device 120 so as to position the camera device 120 within the first height 150 when the remote-controlled vehicle 100 is in both the first and second orientations.

For instance, the second height 155 of the camera mount 115 can be no more than 95% of the first height 150, no more than 90% of the first height 150, no more than 85% of the first height 150, no more than 80% of the first height 150, no more than 75% of the first height 150, no more than 70% of the first height 150, no more than 65% of the first height 150, no more than 60% of the first height 150, no more than 55% of the first height 150, no more than 50% of the first height 150, no more than 45% of the first height 150, no more than 40% of the first height 150, no more than 35% of the first height 150, no more than 30% of the first height 150, no more than 25% of the first height 150, or no more than 20% of the first height 150.

The dimensions to facilitate the described configuration can vary depending on the embodiment (e.g., depending on the type of camera device 120 that the camera mount 115 is configured to removably couple to). As one example, the wheels 110 can define the first height 150 of one inch or more, two inches or more, three inches or more, four inches or more, five inches or more, six inches or more, seven inches or more, eight inches or more, nine inches or more, or ten inches or more. And, as noted, the camera mount 115 can be configured to removably couple to the camera device 120 so as to position the camera device 120 within the first height 150 when the remote-controlled vehicle 100 is in both the first and second orientations.

In some embodiments, the vehicle body 105 can further include a communication device mount 160, as shown in FIG. 6. For example, the communication device mount 160 can be affixed at the first surface 106 of the vehicle body 105. The communication device mount 160 can be configured to removably couple to a wireless communication device, such as a phone, tablet, or other remote computing device. Accordingly, the communication device mount 160 can allow the remote-controlled vehicle 100 to provide two-way communication (e.g., two-way audio communication) capability at the scene where the remote-controlled vehicle 100 is deployed.

As noted, the remote-controlled vehicle 100 can include the wireless receiver 135 to receive wireless signals from a controller (e.g., handheld remote controller). In one embodiment, this controller can include its own communication device mount. The controller's communication device mount can be configured to removably couple to a wireless communication device, such as a phone, tablet, or other remote computing device. This can allow the device coupled to the controller's communication device mount to communicate with the device coupled to the remote-controlled vehicle's communication device mount 160. This can allow for a cost-effective, easily deployed two-way audio communication capability at the remote-controlled vehicle 100. And, the device coupled to the controller's communication device mount may be in wireless communication with the camera device 120 coupled to the camera mount 115 at the remote-controlled vehicle 100 so as to receive and display image data captured by the camera device 120.

The remote-controlled vehicle 100 can include a battery that can provide a source of power for operating the remote-controlled vehicle 100. In one embodiment, the battery can be a rechargeable battery, though in another embodiment the battery can be a periodically replaced battery.

FIGS. 7-13 show a second embodiment of a remote-controlled vehicle 200. The remote-controlled vehicle 200 can have any one or more features shown and/or described with respect to the remote-controlled vehicle 100 elsewhere herein, and, as such, like reference characters are used to indicate like elements. As such, the following description of the remote-controlled vehicle 200 will focus on features not necessarily shown or described with respect to the remote-controlled vehicle 100. Though, it is to be understood, the remote-controlled vehicle 100 can likewise include any one or more features shown and/or described with respect to the remote-controlled vehicle 200.

Figure 7:
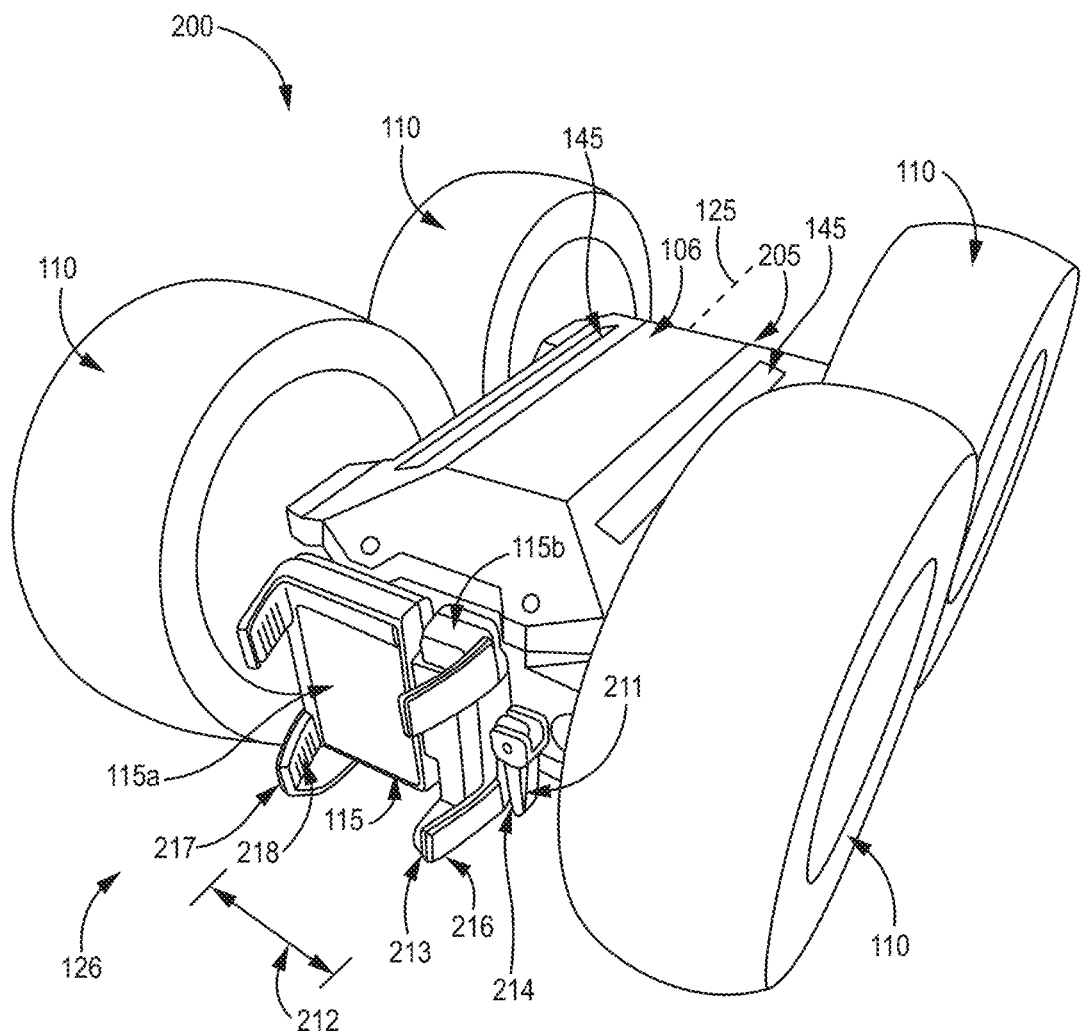
FIG. 7 is a perspective view of a second embodiment of a remote-controlled vehicle.

FIG. 7 illustrates a perspective view of the remote-controlled vehicle 200. As shown here, the remote-controlled vehicle 200 can include a vehicle body 205, the wheels 110, and the camera mount 115. The wheels 110 and the camera mount 115 are affixed to the vehicle body 205. Like the remote-controlled vehicle 100, the remote-controlled vehicle 200 can be configured to move at first and second different orientations. For example, the remote-controlled vehicle 200 can be configured to move in a first orientation where: the central longitudinal plane 125 extends parallel to the ground surface 126, the first (e.g., "top") surface 106 of the vehicle body 205 faces away from the ground surface 126, and the second (e.g., "bottom") surface 107, which is opposite the first surface 106, faces toward the ground surface 126. This first orientation is shown in FIG. 7. The remote-controlled vehicle 200 can also be configured to move in a second orientation where: the central longitudinal plane 125 extends parallel to the ground surface 126, the second (e.g., "bottom") surface 107 of the vehicle body 205 faces away from the ground surface 126, and the first (e.g., "top") surface 106 faces toward the ground surface 126. As such, the second orientation can be an orientation that is rotated one hundred and eighty degrees about the central longitudinal plane of the vehicle body 205 from the first orientation (e.g., "flipped upside down"). In this way, the remote-controlled vehicle 200 can move along the ground surface 126 in the first orientation, flip one hundred and eighty degrees, and then continue to move along the ground surface 126 in the second orientation (e.g., an "upside-down" orientation).

The camera mount 115 is affixed at the vehicle body 205, such as at a location on the vehicle body 205 between the first and second opposite sides of the vehicle body 205 at which the wheels 110 are affixed. More particularly, as shown in FIG. 7, the camera mount 115 can be affixed at the vehicle body 205 at a location on the vehicle body 205 both i) between the first and second opposite sides of the vehicle body 205 (the sides at which the wheels 110 are affixed), and ii) at, or near, an end portion of the vehicle body 205 (e.g., a front end portion of the vehicle body 105, as shown in FIG. 7). The camera mount 115 can be configured to removably couple to the camera device 120 (e.g., shown in FIG. 1). In this way, the camera device 120 can be conveniently coupled to, and removed from, the camera mount 115. And, as described previously, the wheels 110 can define the first height 150, and the camera mount 115 can define the second height 155 that is less than the first height 150 such that the camera mount 115 can be positioned within the first height 150. And, the camera mount 115 can be configured to removably couple with the camera device 120 such that the camera device 120 does not extend outside of the first height 150.

FIG. 7 shows one exemplary embodiment of the camera mount 115. As shown in this example, the camera mount 115 includes a plurality of support arms 216 that are configured to receive and hold the camera device. The plurality of support arms 216 can have an interior surface 217 that is configured to contact the camera device when the camera device is coupled to the camera mount 115. As shown in the illustrated embodiment, the interior surface 217 can include a series of frictional elements 218 that are configured to increase the retention force at the interior surface 217 for holding the camera device in place at the camera mount 115 (e.g., the frictional elements 218 have a coefficient of friction greater than a coefficient of friction at one or more other portions of the camera mount 115). As also shown in the illustrated embodiment, one or more of the plurality of support arms 216 can curve inwards toward the vehicle body 205 to provide further retention force for holding the camera device in place at the camera mount 115. More specifically, the support arms 216 can include a first end 214 nearest the vehicle body 205 and a second, opposite end 213 furthers from the vehicle body 205. The curvature of the one or more support arms 216 can position the second end 213 closer to the central longitudinal plane 125 than the first end 214.

In some embodiments, such as that shown here, the camera mount 115 can be configured to adjust a width 212 between the support arms 216. For instance, the camera mount 115 can include a first camera mount portion 115a and a second camera mount portion 115b, and the second camera mount portion 115b can be movable relative to the first camera mount portion 115a so as to change the width 212 between support arms 216 at opposite sides of the camera mount 115. The first camera mount portion 115a can include at least one support arm 216 and the second camera mount portion 115b can include at least one support arm 216 such that as the second camera mount portion 115b is moved (e.g., slid) relative to the first camera mount portion 115a the width 212, between the at least one support arm 216 at the second camera mount portion 115b and the at least one support arm 216 at the first camera mount portion 115a, is changed (e.g., to an extent corresponding to the extent of the relative movement between the first and second camera mount portions 115a, 115b). To facilitate the width adjustment, the camera mount 115 can include an actuator 211. When actuated, the actuator 211 can be configured to permit relative movement between the first and second camera mount portions 115a, 115b, for instance by unlocking the second camera mount portion 115b to allow it to move relative to the first camera mount portion 115a. Then, when the width 212 is made appropriate for holding a specific camera device at the camera mount 115, the actuator 211 can be actuated again (e.g., released) so as to fix the first and second camera mount portions 115a, 115b in place relative to one another.

Figure 8:
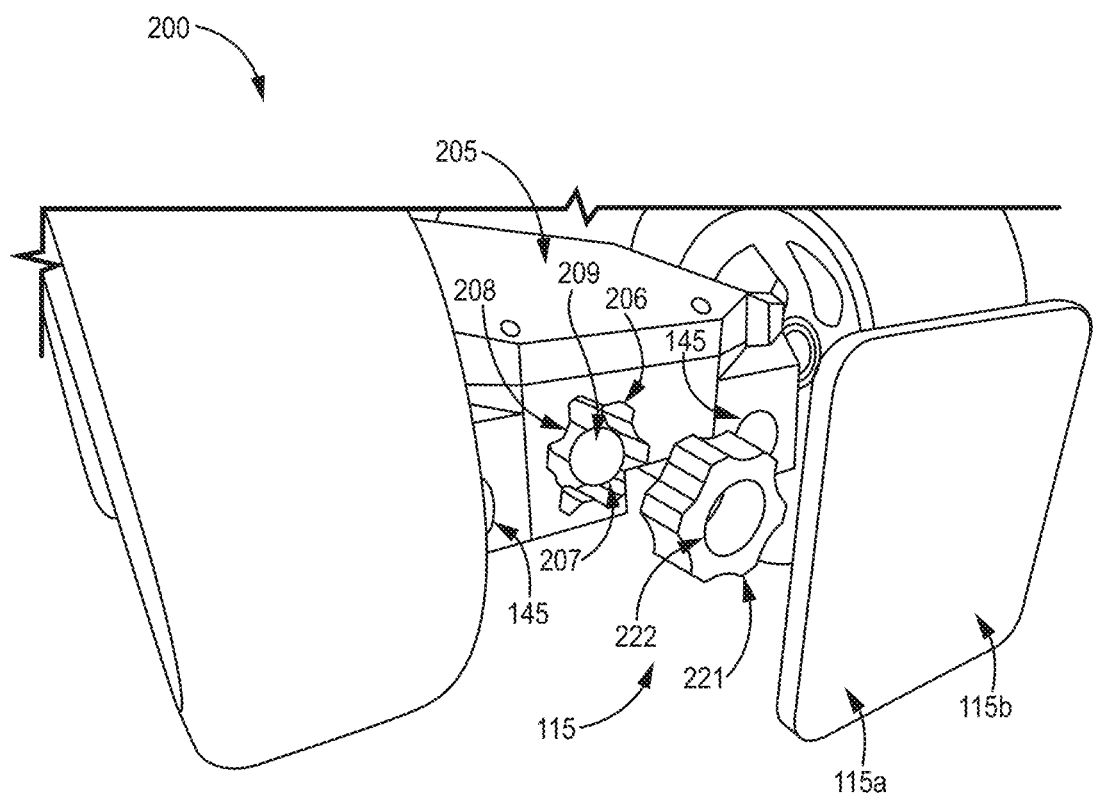
FIG. 8 is a perspective view of a front side of the second embodiment of the remote-controlled vehicle showing a partially exploded view of an embodiment of a camera mount.

FIG. 8 is a perspective view of a front side of the remote-controlled vehicle 200 showing a partially exploded view of the camera mount 115. More specifically, FIG. 8 illustrates one exemplary configuration for fixing the camera mount 115 to the vehicle body 205. In FIG. 8, the first and second camera mount portions 115a, 115b are shown schematically, and without support arms, for simplicity.

The vehicle body 205 can include a recessed mount receptacle 206 that extends into the vehicle body 205. A mount arm 207 can be included within the mount receptacle 206, and the mount arm 207 can be configured to couple the camera mount 115 to the vehicle body 205 within the recessed mount receptacle 206. The mount arm 207 can include a first mount arm end 208 and a second, opposite mount arm end 209. The first mount arm end 208 can be affixed to the vehicle body 205 within the interior of the vehicle body 205. The second mount arm end 209 can include a ball joint that can be configured to couple to one or both of the first and second camera mount portions 115a, 115b so as to allow the camera mount 115 to be pivotable relative to the vehicle body 205. A coupling element 221 can be received at the recessed mount receptacle 206. For instance, the coupling element 221 can be received at the recessed mount receptacle 206 and at the mount arm 207 such that the ball joint at the second mount arm end 209 extends through an aperture 222 of the coupling element 221. The coupling element 221 can have a perimeter surface that meshes with (e.g., matches) the perimeter surface of the vehicle body 205 defining the recessed mount receptacle 206 so as to retain the coupling element 221 at the recessed mount receptacle 206.

Together, the mount arm 207 and the coupling element 221 can couple the camera mount 115 to the vehicle body. Namely, the mount arm 207, and, in some cases additionally the coupling element 221, can be coupled to a base of the camera mount 115 to couple the camera mount 115 to the vehicle body 205. In some embodiments, such as that shown here, the second mount arm end 209, including the ball joint, can be located within the mount receptacle 206 such that the mount arm 207 does not extend out from the vehicle body 205. Likewise, in some such embodiments, the coupling element 221 can be located within the recessed mount receptacle 206 such that the coupling element 221 does not extend out from the vehicle body 205. In this way, the connection between the base of the camera mount 115 and the mount arm 221 and coupling element 221 can be located within the mount receptacle, and thus within the vehicle body 205. This can be useful in providing a durable remote-controlled vehicle since the connection holding the camera mount 115 in place at the vehicle body 205 is protected by the vehicle body 205 (e.g., the recessed mount receptacle 206) so as to be less susceptible to exterior contact forces (e.g., if the remote-controlled vehicle 200 hit an exterior object when moving).

As also shown in FIG. 8, the front side of the vehicle body 205 can include one or more light sources 145. In the illustrated embodiment, the front side of the vehicle body 205 includes two light sources 145, with the camera mount 115 positioned between the two light sources 145 at the front side of the vehicle body 205. As described previously here, the light sources 145 can include one or more light elements 146 configured to illuminate the field of the view of the camera device positioned at the camera mount 115.

Figure 9:
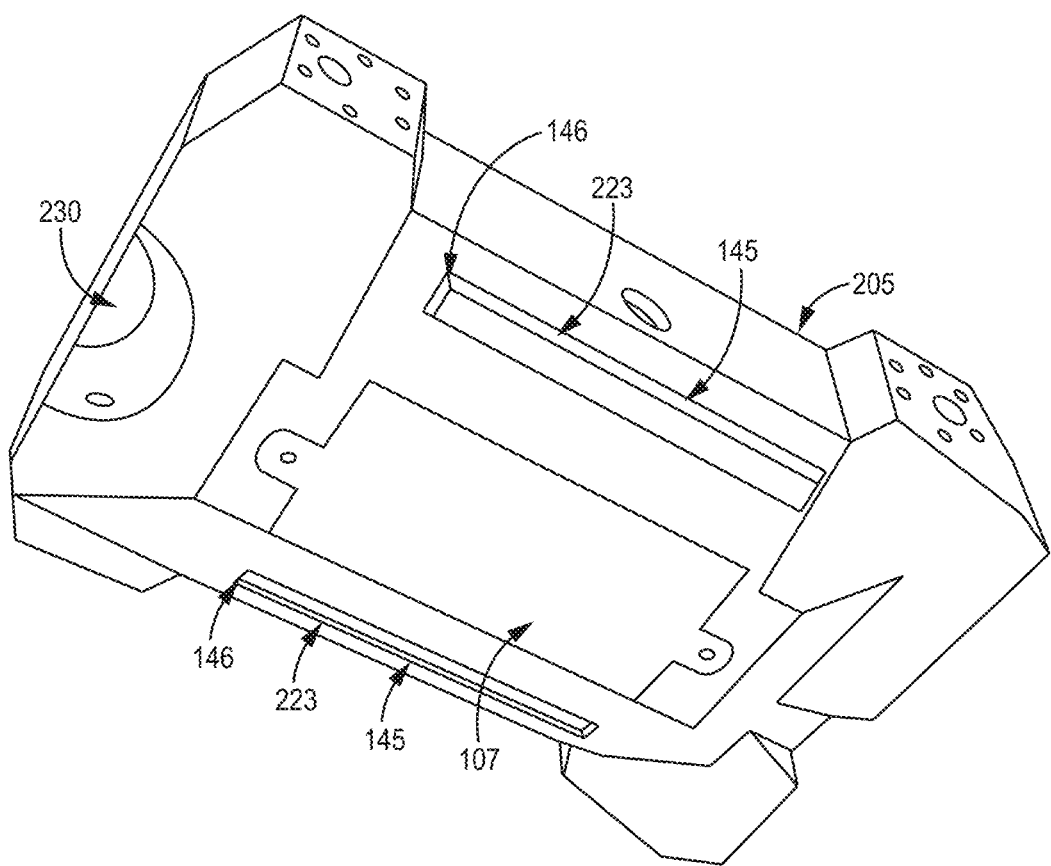
FIG. 9 is a perspective view of a bottom side of the vehicle body of the second embodiment of the remote-controlled vehicle.

FIG. 9 illustrates a perspective view of the second (e.g., "bottom") surface 107 of the remote-controlled vehicle 200. As shown here, the second surface 107 can include one or more light sources 145. Each light source 145 can include one or more light elements 146 configured to out light energy (e.g., in the visible light spectrum and/or the infrared light spectrum). In the illustrated embodiment, the second surface 107 includes recessed light receptacles 223. The recessed light receptacles extend into the vehicle body 205, and the light elements 146 can be positioned within the recessed light receptacles 223. In some examples, the light elements 146 can be positioned at an angle relative to the recessed light receptacles 223 so that the light elements 146 are configured to direct light out from the recessed light receptacles 223.

Figure 10:
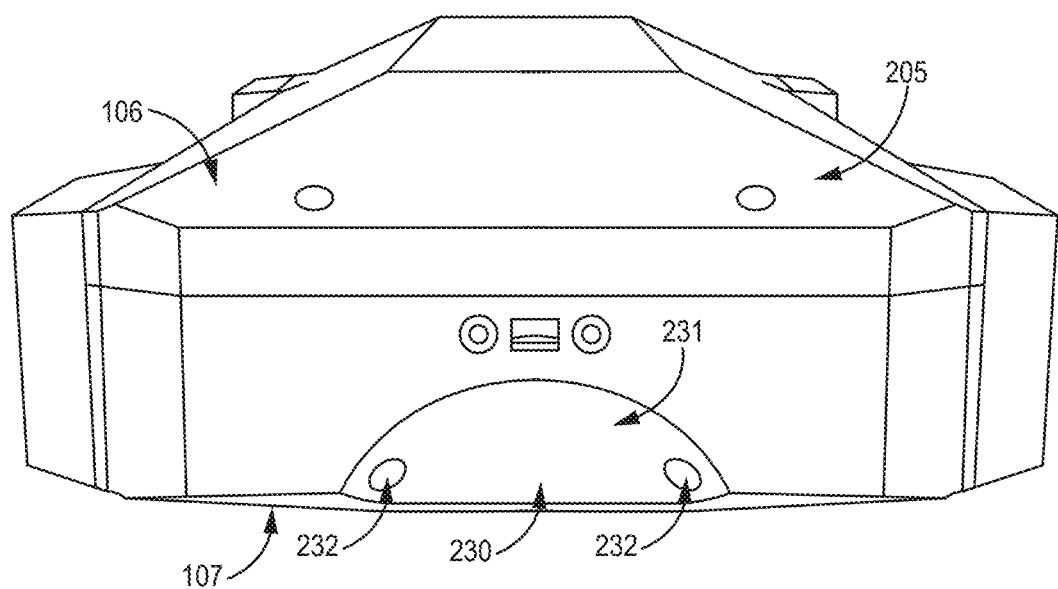
FIG. 10 is a back elevational view of the vehicle body of the second embodiment of the remote-controlled vehicle.

FIG. 10 illustrates a back elevational view of the vehicle body 205 of the remote-controlled vehicle 200. In the example shown here, the back side (e.g., opposite the front side having the camera mount 115) of the vehicle body 205 can include a carrying coupling 230. The carrying coupling 230 can define a recessed cutout 231 at the back side of the vehicle body. The carrying coupling 230 can include one or more carrying coupling elements 232 that are configured to couple to a respective complementary coupling element of a carrying member so as to allow the remote-controlled vehicle 200 to be conveniently transported via the carrying member. In the illustrated embodiment, the carrying coupling elements 232 are defined as apertures at the recessed cutout 231 and extend into the vehicle body 205 from the recessed cutout 231. For example, a portion of the carrying member can be placed at the recessed cutout 231 and the carrying coupling elements 232 can receive threat respective complementary coupling elements of the carrying member and, thereby, removably couple to the carrying member. The carrying member could be, for example, a belt, firearm sling, or other wearable feature typically worn by a law enforcement officer.

Figure 11:
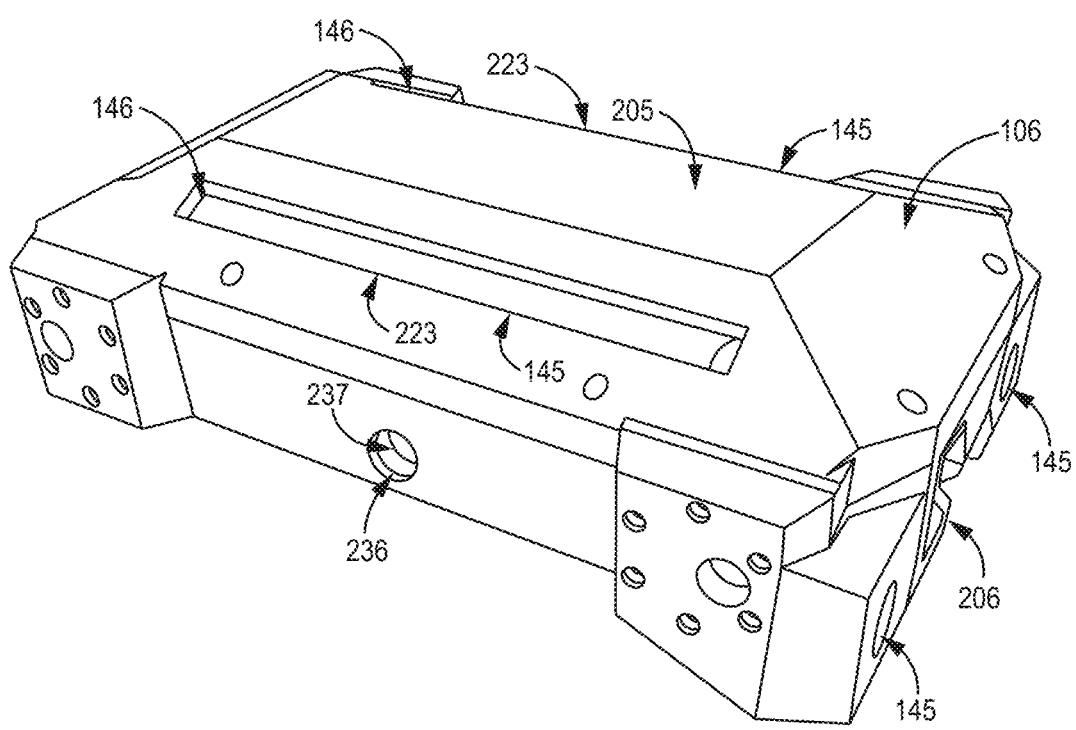
FIG. 11 is a perspective view of a side of the vehicle body of the second embodiment of the remote-controlled vehicle.

FIG. 11 is a perspective view of one side of the vehicle body 205 of the remote-controlled vehicle 200. The illustrated side of the vehicle body 205 can include a power switch aperture 236. A power switch 237 can be positioned within the power switch aperture 236. In some such examples, the power switch 237 can terminate flush with the outer surface of the vehicle body, such that the body of the power switch 237 is enclosed within the power switch aperture 236. The power switch 237 can be configured, when actuated, to turn the remote-controlled vehicle's power supply (e.g., battery) on and off. Accordingly, by embedding the power switch 237 at the power switch aperture 236, instances of inadvertent actuation of the power switch 237 can be reduced. And, such an arrangement may make the presence of the power switch 237 more difficult for an adverse party (e.g., present in the environment in which the remote-controlled vehicle 200 is deployed) to discern.

As also seen in FIG. 11, the first (e.g., "top") surface 106 of the vehicle body 205 can include one or more light sources 145. The light sources 145 at the first surface 106 can be similar to that described previously for other light sources at the vehicle body 205.

Figure 12:
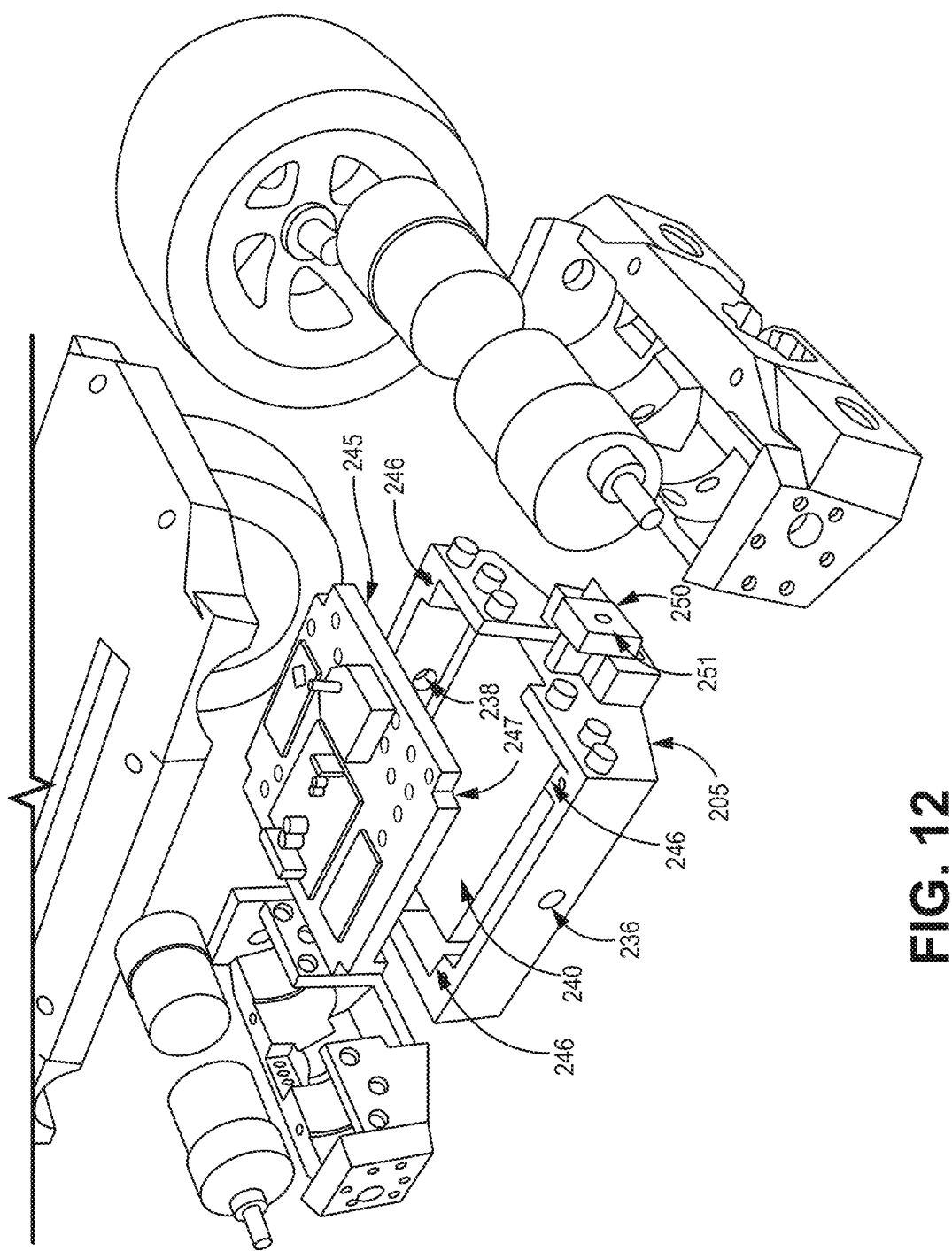
FIG. 12 is an exploded, perspective view of the vehicle body of the second embodiment of the remote-controlled vehicle.

In addition, the vehicle body 205 can include an electrical port 238 (shown, e.g., in FIG. 12). The electrical port 238 can be configured to facilitate an electrical connection to one or more components within the vehicle body. As one example, the electrical port 238 can be configured to electrically connect to a power supply for charging a battery within the vehicle body 205. As an additional example, the electrical port 238 can be configured to electrically connect to a computing device for programming (e.g., downloading) computer executable instructions to a non-transitory storage article within the vehicle body for later execution by the processing means. This can be useful, for instance, in providing software updates to the remote-controlled vehicle 200. In one embodiment, the electrical port 238 can be a USB port, which can be configured to both electrically connect to a power supply for charging and electrically connect to a computing device for programming. The USB port could be located, for example, at a side of the vehicle body 205 opposite the power switch aperture 236.

Figure 13:
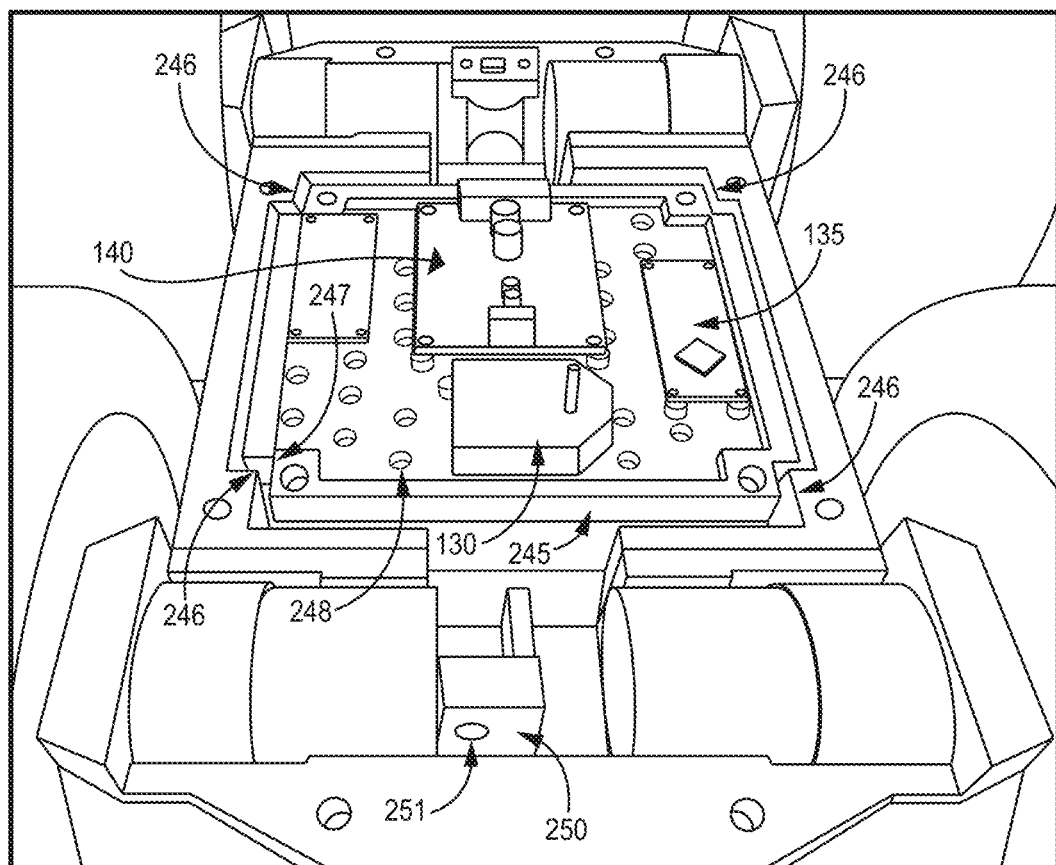
FIG. 13 is a perspective view of the assembled vehicle body, with a top housing portion removed for visibility of interior components, of the second embodiment of the remote-controlled vehicle.

FIGS. 12 and 13 illustrate certain components housed within the vehicle body 205. FIG. 12 is an exploded, perspective view of the vehicle body 205 of the remote-controlled vehicle 200, and FIG. 13 is a perspective view of the assembled vehicle body 205 with a top housing portion of the vehicle body 205 removed for easier visibility of interior components housed within the vehicle body 205.

A power source 240 can be located within the vehicle body 205. The power source 240 can be, for example, a rechargeable battery (e.g., a rechargeable lithium ion battery). The power source 240 can be electrically coupled to each of the power switch at the power switch aperture 236, for instance to allow the power source 240 to be selectively turned on and off, and the electrical port 238, for instance to allow the power source 240 to be recharged.

Also within the vehicle body 205 can be an electronics tray 245. The electronics tray 245 can include one or more of the motive source 130 (e.g., a motor, such as an electric motor, for instance an electric gear motor), the wireless receiver 135, and the processing means 140, as well as other components as needed for various functions as desired. The electronics tray can be positioned within the vehicle body 205 in a stacked arrangement relative to the power source 240, which can allow for a more compact vehicle body 205 as well as a more efficient assembly since the components at the electronics tray 245 can be assembled at the electronics tray 245 before needing to be placed within the vehicle body 245. Namely, in the illustrated example, the electronics tray 245 is stacked on top of the power source 240. In some embodiments, such as that shown here, the electronics tray 245 can include a plurality of apertures 248 along its base surface, which may allow for improved temperature control within the vehicle body 205 and, thereby, help to reduce risk of component overheating within the vehicle body 205.

In the illustrated embodiment, the vehicle body 205 includes corner posts 246 at an interior portion of the vehicle body 205, and the electronics tray 245 includes complementary post receptacles 247 that are configured to interface with the corner posts 246. The presence of the corner posts 246 and interfacing, complementary post receptacles 247 can provide additional durability to the electronics tray, for instance, when the remote-controlled vehicle 200 runs in to an exterior object.

As shown in FIGS. 12 and 13, the vehicle body 205 can include a mount arm receptacle 250 for supporting the mount arm 207 for coupling the camera mount 115 to the vehicle body. In the example shown, the mount arm receptacle 250 includes a mount arm receptacle aperture 251 that is configured to receive the mount arm 207 threat. As such, the mount arm receptacle 250 can be positioned adjacent to the recessed mount receptacle 206 and receive the first mount arm end 208 at the mount arm receptacle aperture 251. In this way, the camera mount 115 can be coupled to the vehicle body 205 in a manner that provides additional structure support to the camera mount 115 coupling and, as a result, increases the robustness and durability or the camera mount 115 for use in various potentially challenging, rugged environments.

Figure 14:
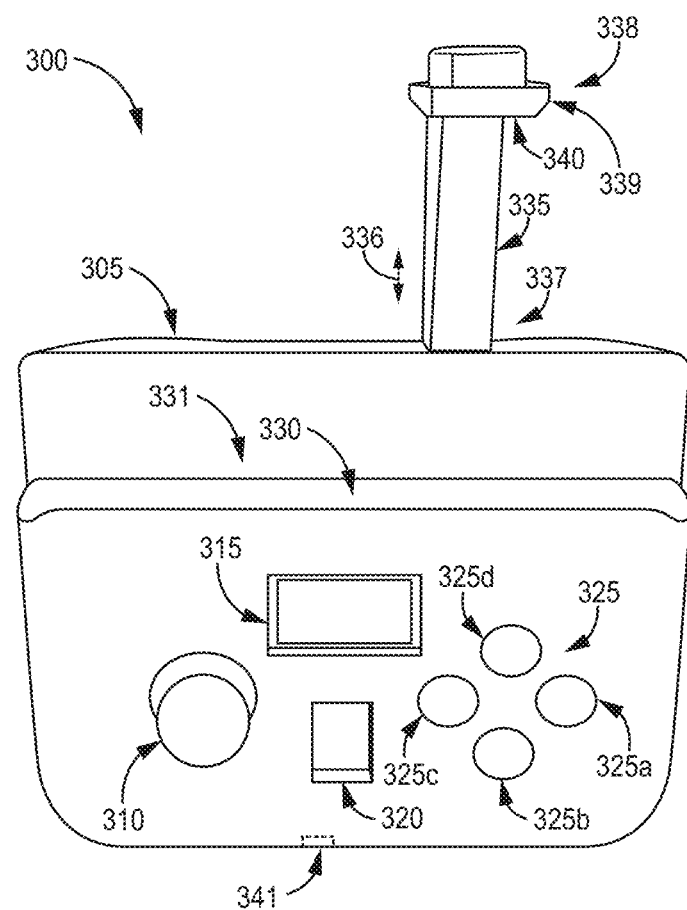
FIG. 14 is a perspective view of an embodiment of a remote controller for use with embodiments of the remote-controlled vehicle.

FIG. 14 illustrates a perspective view of an embodiment of a remote controller 300 for use with embodiments of the remote-controlled vehicle 100, 200. As described elsewhere herein, the remote controller 300 can be configured to transmit one or more wireless signals to the wireless receiver 135 at the remote-controlled vehicle.

The remote controller 300 includes a controller body 305. The controller body 305 includes a number of user interface features for use in inputting one or more control commands for the remote-controlled vehicle and/or for indicating status information pertaining to the remote-controlled vehicle. In the illustrated embodiment, the controller body 305 includes a movement input 310. The movement input 310 can be configured to receive user input thereat indicating a movement command for the remote-controlled vehicle. For instance, the movement input 310 can be configured to receive user input thereat indicating a start movement command for the remote-controlled vehicle (e.g., to cause at least one of the wheels 110 to rotate relative to the vehicle body 105 so as to move the remote-controlled vehicle) as well as a movement speed command for the remote-controlled vehicle (e.g., to specify a rate of rotation of the one or more wheels 110 to be moved). In some cases, the movement input 310 can additionally be configured to receive user input thereat indicating a direction movement command for the remote-controlled vehicle (e.g., to cause at least one wheel 110 to turn the remote-controlled vehicle).

In the illustrated example, the movement input 310 is in the form of a joystick, which can be configured to receive user input at three hundred and sixty degrees to provide to start movement command and the direction movement command corresponding to the direction in which the user input moves the joystick. Also in the illustrated example, the joystick can be configured to receive user input pushing down on the joystick to toggle between various preset movement speeds for the remote controlled vehicle. For example, remote controller 300 can be preset such that one push down on the joystick corresponds to a first movement speed setting for the remote-controlled vehicle, and two pushes down on the joystick corresponds to a second movement speed setting for the remote-controlled vehicle different than the first movement speed setting. For example, the first speed setting can correspond to a first range of speeds for movement commands at the joystick that is a narrower range of speeds than a second range of speeds for movement commands when in the second speed setting. In this way, a user can provide movement speed commands to the remote-controlled vehicle, via the remote controller 300, appropriate for the particular environment within which the remote-controlled vehicle is deployed (e.g., lower movement speed setting to allow for more gradual/sensitive control over movement speed commands for confined spaces).

The controller body 305 can also include one or more user displays 315 and a controller power switch 320. The controller power switch 320 can be actuated by a user to turn the remote controller 300 on/off The user display 315 can provide status information relating to the remote-controlled vehicle, such as battery information (e.g., relative charge level of battery, low battery, etc.), speed setting, and remote-vehicle approaching a boundary for communication range with the remote controller 300. For example, such information can be presented at the user display 315 in the form of various distinct, corresponding icons.

The controller body 305 can further include one or more additional command inputs 325. In the illustrated example, the controller body 305 includes a plurality of command inputs 325 in the form of push buttons. These command inputs can be programmed to allow for user input corresponding to a variety of commands for the remote-controlled vehicle. For example, a first command input 325a can be actuated to turn on/off a first light source 145 (e.g., at the front of the remote-controlled vehicle), a second command input 325b can be actuated to turn on/off a second light source 145 (e.g., at the top surface of the remote-controlled vehicle), and a third command input 325c can be actuated to turn on/off a third light source 145 (e.g., at the bottom surface of the remote-controlled vehicle). The fourth command input 325d can be configured, for example, to switch one or more light elements 146 at the remote-controlled vehicle between different light wavelengths (e.g., to switch between visible light output and infrared light output).

As shown in the example of FIG. 14, the controller body 305 can additionally include a communication device mount surface 330. In the illustrated embodiment, the communication device mount surface 330 is formed as a ledge that extends out from a communication device support surface 331 at the controller body 305. The remote controller's communication device mount surface 330 can be configured to removably receive and support a wireless communication device, such as a user's phone (e.g., smartphone), tablet, or other remote user computing device. This can allow the wireless communication device, received at the remote controller's communication device mount surface 330, to communicate with the camera device coupled to the remote-controlled vehicle's camera mount 115. This can allow for a cost-effective, easily deployed two-way audio communication capability at the remote-controlled vehicle. And, the wireless communication device received at the remote controller's communication device mount surface can be in wireless communication with the camera device coupled to the camera mount 115 at the remote-controlled vehicle so as to receive and display image data captured by the camera device at the wireless communication device received at the remote controller 300.

To provide additional support to hold the wireless communication device at the remote controller 300, the controller body 305 can include a holding arm 335. The holding arm 335 can include a retainer contact 339 at an end portion of the holding arm 335 opposite the communication device mount surface 330. The retainer contact 339 can be configured to contact the wireless communication device received at the remote controller 300, and, in some embodiments, the retainer contact 339 can include a frictional surface 340 having a coefficient of friction greater than a coefficient of friction at one or more other portions of the controller body 305. More specifically, the communication device mount surface 330 can contact one end of the wireless communication device received at the remote controller 300 while the retainer contact 339 can contact an opposite end of the wireless communication device received at the remote controller 300. The holding arm 335 can be movable relative to the controller body 305 in a direction 336 so as to adjust a distance between the retainer contact 339 and the communication device mount surface 330. For example, the holding arm 335 can be biased (e.g., spring-biased via a spring mechanism located within the controller body 305) toward a first holding arm position 337 adjacent the communication device support surface 331 at the controller body 305. This bias on the holding arm 335 can be overcome by a user applying force (e.g., pulling) at the holding arm 335 and, while applying this force, moving the holding arm 335 away from the communication device support surface 331 to a second holding arm position 338 further from the communication device support surface 331 than the first holding arm position 337. Accordingly, the holding arm 335 can be moved to adjust the distance between the retainer contact 339 and the communication device mount surface 330 as appropriate for the particular size of wireless communication device to be received at the remote controller 300.

The controller body 305 can also include an electrical port 341. The electrical port 341 can be configured to facilitate an electrical connection to one or more components within the controller body 305. As one example, the electrical port 341 can be configured to electrically connect to a power supply for charging a battery within the controller body 305. As an additional example, the electrical port 341 can be configured to electrically connect to a computing device for programming (e.g., downloading) computer executable instructions to a non-transitory storage article within the controller body 305 for later execution by the processing means within the controller body 305. This can be useful, for instance, in providing software updates to, or reprogramming of (e.g., changing a function associated with one of the command inputs 325), the remote controller 300. In one embodiment, the electrical port 341 can be a USB port, which can be configured to both electrically connect to a power supply for charging and electrically connect to a computing device for programming within the controller body 305.

As is apparent from the preceding description, the remote controller 300 can further include a wireless transmitter, for instance inside the controller body 305, for transmitting one or more user input commands provided at the remote controller 300 to the remote-controlled vehicle. In some cases, the remote controller 300 and the remote-controlled vehicle (e.g., the remote-controlled vehicle 100, the remote controlled vehicle 200) can be in two-way wireless signal communication, such that each of the remote controller 300 and the remote-controlled vehicle include a wireless transceiver configured to send and receive wireless data. The remote controller 300 can also include a processing means, for instance inside the controller body 305, for executing computer-executable instructions stored at a non-transitory storage medium of the remote controller 300. For example, the remote controller's processing means can be configured to receive one or more of the user input commands provided at the controller body 305, and, in response, execute the computer-executable instructions stored at a non-transitory storage medium of the remote controller 300 to cause a wireless signal, corresponding to the user input command provided at the controller body 305, to be output from the remote controller's wireless transmitter and sent to the wireless receiver at the remote-controlled vehicle.

Various non-limiting exemplary embodiments have been described. It will be appreciated that suitable alternatives are possible without departing from the scope of the examples described herein. These and other examples are within the scope of the following claims.

What is claimed is:

1. A remote-controlled vehicle comprising:
    a vehicle body, the vehicle body defining a central longitudinal plane;
    a first wheel rotatably coupled to a first side of the vehicle body;
    a second wheel rotatably coupled to a second side of the vehicle body, wherein each of the first wheel and the second wheel has a first height measured in a direction perpendicular to the central longitudinal plane;
    a camera mount coupled to the vehicle body, wherein the camera mount is configured to removably couple to a camera device, wherein the camera mount has a second height measured in the direction perpendicular to the central longitudinal plane, and wherein the second height is less than the first height such that the camera mount does not extend outside of the first height; and
    a mount arm coupling the camera mount to the vehicle body, wherein the mount arm includes a first mount arm end and a second, opposite mount arm end,
    wherein the vehicle body includes a recessed mount receptacle that is defined at a perimeter surface of the vehicle body,
    wherein the mount arm couples the camera mount to the vehicle body within the recessed mount receptacle with the first mount arm end coupled to the vehicle body within an interior of the vehicle body and the second mount arm end including a ball joint that is coupled to the camera mount so as to permit the camera mount to pivot relative to the vehicle body, and wherein the ball joint is located within the recessed mount receptacle such that the ball joint is configured to couple to the camera mount within the recessed mount receptacle with the camera mount disposed exterior to the vehicle body.

2. The vehicle of claim 1, wherein the first height is defined between opposite ends of each of the first wheel and the second wheel, and wherein the second height is within the first height such that the camera mount does not extend out beyond the opposite ends of each of the first wheel and the second wheel.

3. The vehicle of claim 1, wherein the remote-controlled vehicle is configured to move along a ground surface at each of a first orientation and a second orientation, wherein the second orientation is different than the first orientation.

4. The vehicle of claim 3, wherein the first orientation positions the central longitudinal plane parallel to the ground surface, wherein the second orientation positions the central longitudinal plane parallel to the ground surface, and wherein the second orientation is rotated one hundred and eighty degrees about the central longitudinal plane from the first orientation.

5. The vehicle of claim 4, wherein the second height is within the first height such that the camera mount does not extend out beyond opposite ends of each of the first wheel and the second wheel in both the first orientation and the second orientation.

6. The vehicle of claim 1, further comprising:
    a coupling element, together with the mount arm, coupling the camera mount to the vehicle body,
    wherein the coupling element is received at the recessed mount receptacle and the ball joint of the mount arm extends through an aperture of the coupling element.

7. The vehicle of claim 6, wherein the coupling element includes a perimeter that meshes with a perimeter of a surface of the vehicle body defining the recessed mount receptacle.

8. The vehicle of claim 1, further comprising:
    a wireless receiver located at the vehicle body, wherein the wireless receiver is configured to receive a wireless vehicle movement command signal from a remote controller, and wherein, in response to the received wireless vehicle movement command signal, the remote-controlled vehicle is configured to cause at least one of the first wheel and the second wheel to rotate relative to the vehicle body.

9. The vehicle of claim 1, further comprising:
    an electronics tray positioned within the vehicle body, wherein the electronics tray includes a component selected from the group consisting of: a motive source for the remote-controlled vehicle, a wireless receiver, and a processing means,
    wherein the electronics tray is positioned within the vehicle body in a stacked arrangement with a power source for the remote-controlled vehicle.

10. The vehicle of claim 9, wherein the electronics tray includes a plurality if of apertures along a base of the electronics tray.

11. The vehicle of claim 9, wherein the vehicle body includes a plurality of corner posts at an interior portion of the vehicle body, and wherein the electronics tray includes a plurality of post receptacles, complementary to the plurality of corner posts, interfacing with a respective corner post of the plurality of corner posts.

12. The vehicle of claim 1, wherein the vehicle body includes a carrying coupling, wherein the carrying coupling defines a recessed cutout at the vehicle body and the carrying coupling includes a carrying coupling element that is configured to couple to a complementary coupling element of a carrying member so as to allow the remote-controlled vehicle to be transported via the carrying member.

13. A system comprising:
   a remote-controlled vehicle comprising:
      a vehicle body, the vehicle body defining a central longitudinal plane,
      a first wheel rotatably coupled to the vehicle body, wherein the first wheel has a first height measured in a direction perpendicular to the central longitudinal plane, and
      a camera mount coupled to the vehicle body, wherein the camera mount is configured to removably couple to a camera device, wherein the camera mount has a second height measured in the direction perpendicular to the central longitudinal plane, and wherein the second height is less than the first height; and
      a mount arm coupling the camera mount to the vehicle body, wherein the mount arm includes a first mount arm end and a second, opposite mount arm end,
   wherein the vehicle body includes a recessed mount receptacle that is defined at a perimeter surface of the vehicle body,
   wherein the mount arm couples the camera mount to the vehicle body within the recessed mount receptacle with the first mount arm end coupled to the vehicle body within an interior of the vehicle body and the second mount arm end including a ball joint that is coupled to the camera mount so as to permit the camera mount to pivot relative to the vehicle body, and wherein the ball joint is located within the recessed mount receptacle such that the ball joint is configured to couple to the camera mount within the recessed mount receptacle with the camera mount disposed exterior to the vehicle body; and
   a remote controller comprising:
      a controller body,
      a movement input configured to receive user input thereat indicating a movement command for the remote-controlled vehicle, and
      a holding arm including a retainer contact configured to contact a wireless communication device received at the controller body, wherein the holding arm is movable relative to the controller body so as to adjust a distance between the retainer contact and the controller body.

14. The system of claim 13, wherein the controller body includes a communication device mount surface that extends out from a communication device support surface at the controller body and is configured to removably receive and support the wireless communication device received at the controller body, and wherein the holding arm is movable relative to the controller body so as to adjust a distance between the retainer contact and the communication device mount surface.

15. The system of claim 13, wherein the holding arm is movable between a first holding arm position and a second holding arm position, the second holding arm position being further from the controller body than the first holding arm position, and wherein the holding arm is biased to the first holding arm position.

16. The system of claim 13, wherein the movement input is configured to receive user input to change from a first movement speed setting for the remote-controlled vehicle to a second movement speed setting for the remote-controlled vehicle, wherein the first movement speed setting corresponds to a first range of speeds for movement commands received at the movement input, wherein the second movement speed setting corresponds to a second range of speeds for movement commands received at the movement input, and wherein the first range of speeds is a narrower range than the second range of speeds.

17. The system of claim 13, wherein the controller body further includes a command input that, when actuated by a user, causes the remote controller to generate a light command signal for turning a light source at the remote-controlled vehicle on/off.

* * * * *